March 19, 1935.  T. J. WATSON  1,994,550
SCALE
Filed Jan. 15, 1932   2 Sheets-Sheet 1
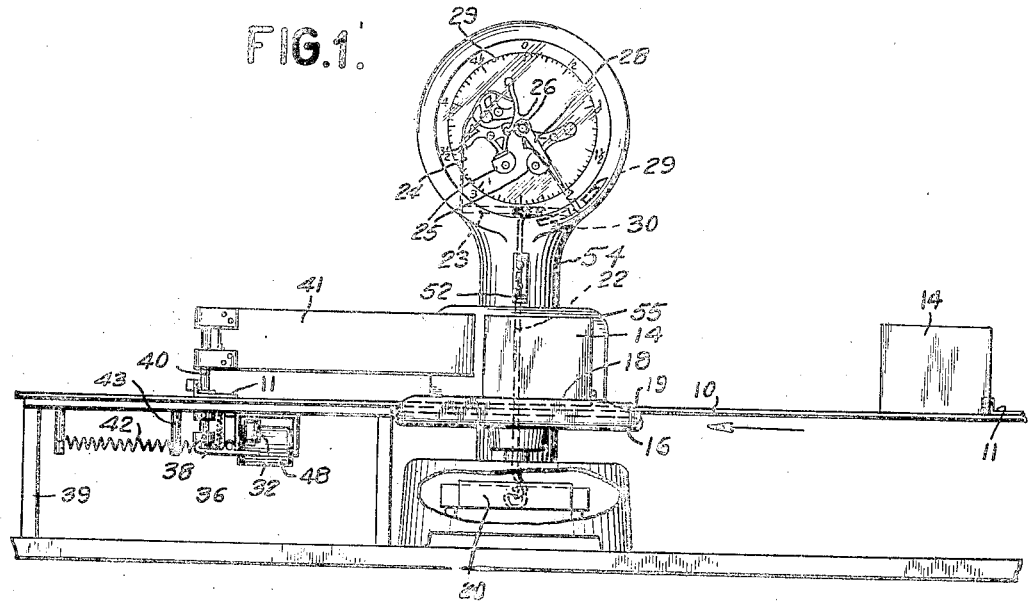
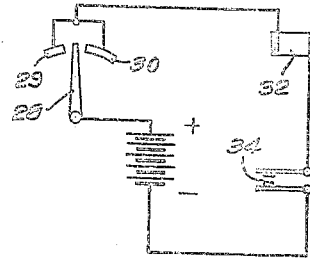
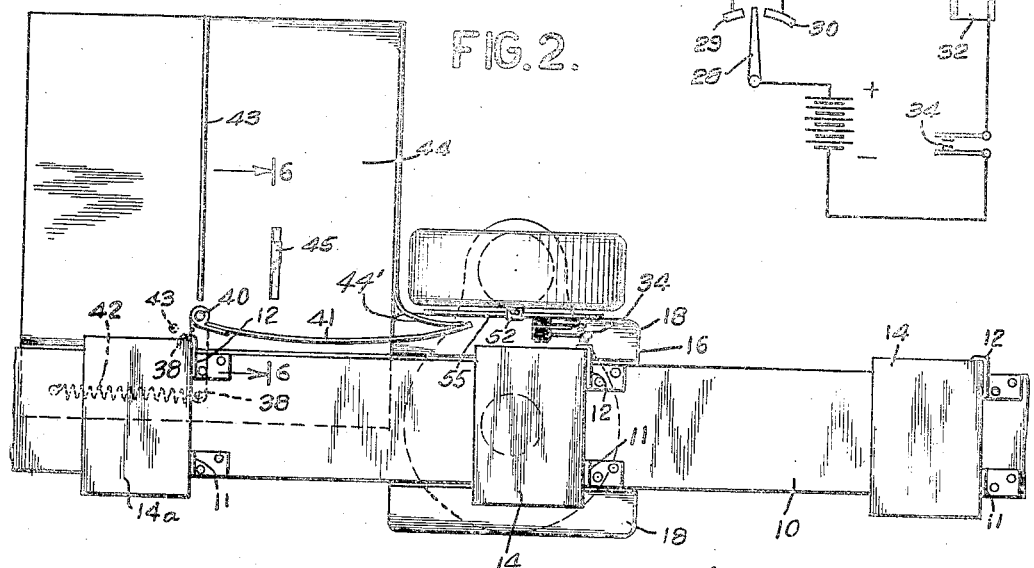
INVENTOR
Thomas J. Watson
BY his ATTORNEY March 19, 1935. T. J. WATSON 1,994,550
SCALE
Filed Jan. 15, 1932 2 Sheets-Sheet 2
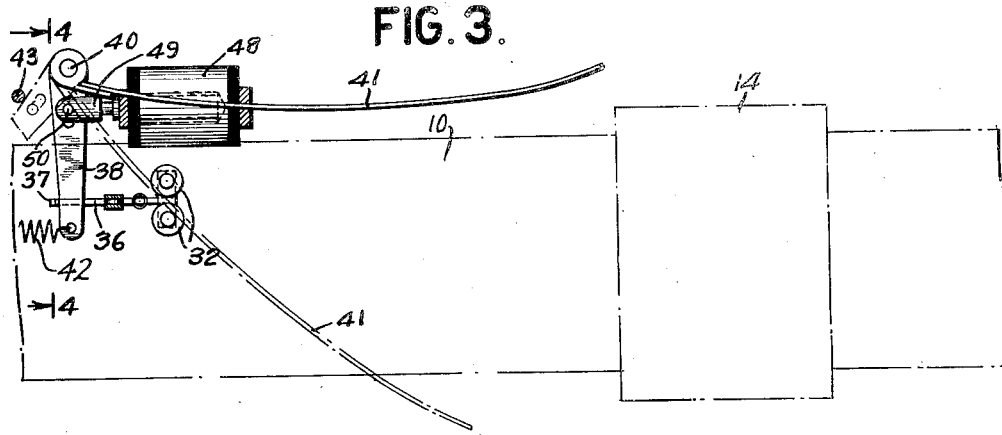
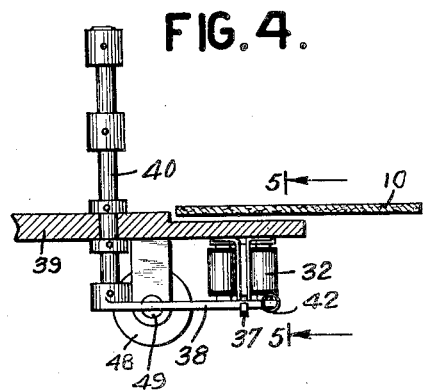
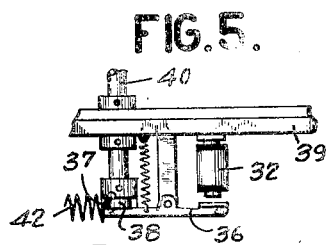
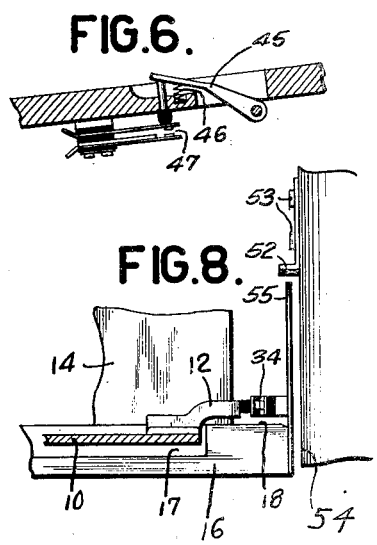
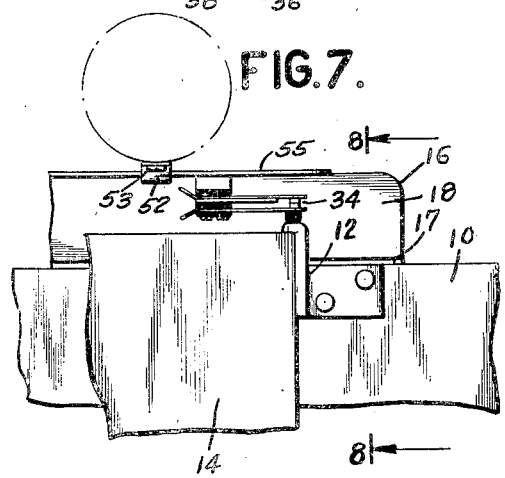
INVENTOR
Thomas J. Watson
BY his ATTORNEY Patented Mar. 19, 1935

1,994,550

UNITED STATES PATENT OFFICE 1,994,550

SCALE

Thomas J. Watson, Short Hills, N. J., assignor, by mesne assignments, to International Business Machines Corporation, New York, N. Y., a corporation of New York Application January 15, 1932, Serial No. 586,812

5 Claims. (Cl. 209—121)

This case relates to article conveyors with means for determining the destination of an article on the conveyor in accordance with its weight.

In general, the object of the invention is to provide automatic weighing means for ejecting a package from a conveyor when the weight of the package is incorrect.

Further, the object is to provide automatic weighing means and electrical controls operated by said means for determining whether a package on a conveyor should be rejected.

Still further, the object is to provide controls operated by automatic weighing means for determining the destination of a package on a conveyor, and a visual indication of the weight to indicate proper operation of the controls.

An object is also to provide a weighing scale for controlling routing of an article while the feeding means is continuously in motion.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a front view of a portion of the conveyor system with the automatic scale and controls;

Fig. 2 is a top view of the same;

Fig. 3 is a detail view of the package deflector and controls therefor;

Fig. 4 is a section on line 4—4 of Fig. 3.

Fig. 5 is a detail of the latch for the deflector taken on line 5—5 of Fig. 4;

Fig. 6 is a section on line 6—6 of Fig. 1;

Fig. 7 is a detail plan view of the scale and conveyor showing the package in weighing position on the platform of the scale;

Fig. 8 is a section on line 8—8 of Fig. 7, and

Fig. 9 is a circuit diagram of the control circuit for the package deflector.

The article feeding system comprises a conveyor or feed belt 10 on which are secured at equal distances apart pairs of transverse abutments 11 and 12. The abutment 12 is an angle piece, one side of which parallels the sides of the belt.

Packages 14 are carried by the belt, one package against each pair of abutments 11 and 12. The belt is continuously moved by any suitable means (not shown) in the direction of the arrow, Fig. 1, to feed a package to the platform 16 of an automatic weighing scale.

The platform 16 is formed with a through channel or passageway 17 to permit free passage of the belt 10 therethrough without contact with the platform. At opposite sides of the channel, the platform has raised portions 18 on which the package rests when the belt is feeding the package over the platform. The right hand ends of portions 18, as viewed in Fig. 1, are formed with inclined surfaces 19 so that as a package is advanced by the belt, the inclined surfaces gradually lift the package off the surface of the belt and onto the platform portions 18. The package continues to advance with the belt, however, because abutments 11 and 12 are still engaged with the package.

The package being on portions 18 of the platform depresses the platform in accordance with its weight. The platform operates the usual base lever system 20 which through draft rod 22, intermediate lever 23, and tape 24, actuates the pendulums 25, indicator rack and pinion 26, and pointer 28. The pointer cooperates with graduated dial 29 to visually indicate the weight of the package.

Carried by the frame of the scale adjacent the tip of the pointer 28 is a pair of contacts 29 and 30 of which the contact 29 may be termed the "under weight" contact and 30, the "over weight" contact. The contacts 29 and 30 are spaced apart in accordance with the permissible under or over tolerance of the package with respect to the correct weight. In the example shown in Fig. 1, the correct weight of a package 14 is two pounds and the tolerance each way is about two ounces. Obviously by spacing the contacts more or less apart, the tolerance may be varied.

When the weight of a package on the platform is correct, the pointer 28 will be between contacts 29 and 30 and free of either contact. The package will then be advanced by the belt uninterruptedly to its normal destination. In Fig. 2 is shown a package 14a which has been found by the scale to be of proper weight and therefore permitted to move along with the belt to its destination.

If the package on the platform is under weight, pointer 28 engages contact 29 while if the package on the platform is over weight, pointer 28 engages contact 30. A control circuit is established in either event which, with reference to Fig. 9, the circuit diagram, is from the plus side of battery A through pointer 28, contacts 29 or 30, magnet 32, and contacts 34, to the minus side of the battery.

Contacts 34 are closed by engagement with the side of abutment 12 when the package reaches approximately central position on the platform, as may be seen from Figs. 2, 7 and 8. The function of contacts 34 is to time the closing of the control circuit, just described, to occur only when the full weight of the package is on the platform and free of the surface of belt 10.

As explained above, when the package on the scale platform is over or under weight, a control circuit is completed which energizes magnet 32. From Fig. 5 it may be seen that magnet 32 when energized rocks armature lever 36 to release the nose end 37 from a horizontal arm 38 located below the top of frame 39 which is below the level of belt 10. Arm 38 is pinned to a vertical shaft 40 journaled in said frame and to which is secured a vertically disposed curved deflector blade 41 above the level of the belt adapted to swing across the belt from full line position to dotted line position (see Fig. 3).

When nose end 37 of armature lever 36 releases arm 38, a spring 42 connected to the arm rocks the latter and shaft 40 clockwise, as viewed in Fig. 3, moving the arm from full line position to dotted line position, engagement of the arm with stop pin 43 preventing further clockwise movement. As the shaft 40 rocks clockwise, the deflector blade 41 moves across the top of belt 10 and into the path of the advancing package, the weight of which has been found by the scale to be incorrect.

As the belt advances the package, the latter cams against the deflector blade and is guided between the blade and a stationary curved deflector wall 44' into a chute 44 which slopes downwardly away from the belt. The package sliding down the chute encounters a lever 45 held slightly above the floor of the chute by a light spring 46 and depresses the lever to close contacts 47. This closes a circuit for energizing a solenoid 48, the plunger 49 of which has a pin and slot connection 50 with arm 38. Plunger 49 moves to the right (as viewed in Fig. 3) thereby rocking shaft 40 counterclockwise replacing deflector blade 41 in full line position, and bringing arm 38 into latching engagement with the nose 37 of lever 36. The parts are now in initial position ready for another operation should the scale find a package to be above or below the required weight.

When the package after being weighed leaves the platform, the pendulums and pointer 28 tend to return to initial position. Were the initial position of pointer 28 to be beyond the contact 29 in a counterclockwise direction, then when the next package be placed on the platform, the contact 29 would be engaged by 28 even if the package were of correct weight. However, contacts 34 in the control circuit are closed by abutment 12 at such a time as to complete the circuit only after the pointer 28 has reached a fairly stable position corresponding to the weight of the package. Thus, if the package be correct in weight, then the pointer 28 will have moved clockwise beyond contact 29 before closing of contacts 34.

As movement of pointer 28 counterclockwise beyond contact 29 is unnecessary, the rise of the platform is limited by a stop 52 adjustably secured by screws 53 to the column 54 of the scale frame. The stop 52 engages the rear vertical flange 55 of the platform when the latter is unloaded and prevents pointer 28 moving back of contact 29.

To briefly summarize the operation of the scale, the articles 14 are spaced equal distances apart on the conveyor belt 10, each package being against a pair of transversely alined abutments 11 and 12. When a package reaches the platform it rides up inclines 19 onto the raised portions 18 of the platform, and continues to move due to its engagement with abutments 11 and 12 of the belt.

As the package moves onto the platform, the pendulums 25 and pointer 28 are operated. When the package is in central position on the platform, abutment 12 will close contacts 34, the time of closing of contacts 34 being such that if the package is under or over weight, the control circuit will not be established until the pointer 28 is at rest and the preceding package 14a is past the pivot of the deflector blade so that the latter when moved to dotted line position will not push package 14a off the conveyor.

If the package is underweight then pointer 28 will remain in engagement with contact 29 to form the control circuit. If the package is over weight, the pointer 28 will move into engagement with contact 30 also closing the control circuit. If the package is correct in weight, then the pointer 28 will have moved between contacts 29 and 30 and clear of either before contacts 34 are closed so that there will be no control circuit formed. In the event that the package is over or under weight, the control circuit will be formed and deflector 41 will be moved into dotted line position (Fig. 3) to engage the package and shunt it into chute 44.

The package will slide down the chute, closing contacts 47 to energize solenoid 48 to replace the deflector blade in full line and inactive position in readiness for the next operation.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In a device of the class described, means for conveying articles, a weighing mechanism, an article support operatively connected thereto, said support having a passageway for said means through which the latter passes without influence on the support and weighing mechanism, said support having raised portions horizontally offset relative to the passageway onto which the belt conveying means as it advances through the passageway feeds the article to be weighed by said mechanism.

2. In a device of the class described, weighing mechanism, a platform for operating the mechanism and having an article supporting surface, an article conveying belt disposed closely adjacent to and at the side of and below said surface and carrying means for moving the article onto the supporting surface while passing the platform, and article sorting means selectively controlled by the weighing mechanism in accordance with the weight of the article carried by said platform surface.

3. In a device of the class described, weighing mechanism, a platform for operating the mechanism and having an intermediate passageway, an article supporting and conveying belt movable through the passageway and disposed below the portions of the platform at the sides of the passageway and having means for holding the article to horizontally overlap said portions to thereby transfer the articles during its motion through the passageway from the belt to the platform to be supported by the latter during the weighing operation.

4. In a device of the class described, weighing mechanism, a platform for operating the mechanism, a movable conveyor belt the top of which provides an underlying support for articles to be carried by the belt to the platform, the belt being movable alongside the platform and having article engaging means to hold the article in horizontal overlapping relation to the platform as the article is moving past the platform whereby the overlapping portion of the article engages the platform during movement of the belt past the platform to cause the article to be supported by the platform, said means continuing to engage and move the article while on the platform to remove the article therefrom after the weighing operation, and sorting means for the articles controlled by the weighing mechanism in accordance with the weight of the article on the platform.

5. In a device of the class described, a movable belt for supporting and feeding articles, a platform having an article supporting surface above the plane of the belt and at the side of the latter and effectively inclined portions leading up to said surface, the belt passing said inclined portions and having means for holding the article to horizontally overlap said portions and said surface and moving the article by contact of the overlapping part of the article with the inclined portions onto said platform surface, weighing mechanism operated by the platform, and auxiliary mechanism controlled by the weighing mechanism in accordance with the weight of the article on said supporting surface of the platform.

THOS. J. WATSON.